United States Patent [19]

Carmichael et al.

[11] 4,335,893
[45] Jun. 22, 1982

[54] FOLDABLE INFANT CARRIER

[75] Inventors: Lee T. Carmichael, Pasadena; Richard E. Hyde, Palos Verdes Estates; Gary L. Smith, Los Angeles, all of Calif.

[73] Assignee: California Strolee, Inc., Compton, Calif.

[21] Appl. No.: 79,833

[22] Filed: Sep. 28, 1979

[51] Int. Cl.³ .............................................. B62B 7/08
[52] U.S. Cl. ...................................... 280/42; 280/650
[58] Field of Search ............... 280/650, 647, 649, 642, 280/42, 87.05; 16/144, 143; 403/102, 100

[56] References Cited

U.S. PATENT DOCUMENTS

| | | | |
|---|---|---|---|
| 2,480,552 | 8/1949 | Colvez | 297/93 |
| 3,550,998 | 12/1970 | Boudreau et al. | 280/647 |
| 3,961,803 | 6/1976 | Fleischer | 280/642 |
| 4,049,292 | 9/1977 | Perego | 280/42 |
| 4,165,097 | 8/1979 | Boudreau et al. | 280/647 |
| 4,181,317 | 1/1980 | Toda | 280/650 X |
| 4,216,974 | 8/1980 | Kassai | 280/650 X |

OTHER PUBLICATIONS

Baby Stroller, KY-247, Kwang Ye Enterprize Co., Ltd. Tainan Taiwan.
Super Bye Bye, Perego, 127 Main Street, Hempstead, N.Y.

Primary Examiner—John A. Pekar
Attorney, Agent, or Firm—Lyon & Lyon

[57] ABSTRACT

An infant carrier foldable along a central plane is presented. The carrier comprises a frame and seat assembly foldable along the central plane and lockable in the open position. A unique trigger mechanism is provided which locks the carrier in the open position and provides a handle for adjusting the seat position and for folding the carrier.

8 Claims, 8 Drawing Figures

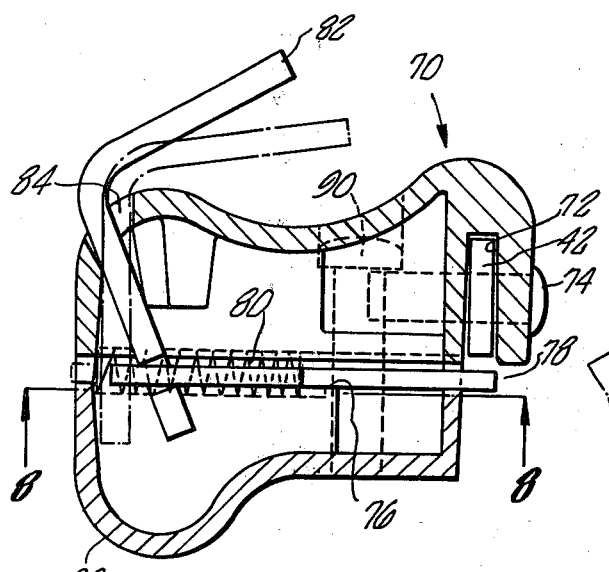
FIG_6_
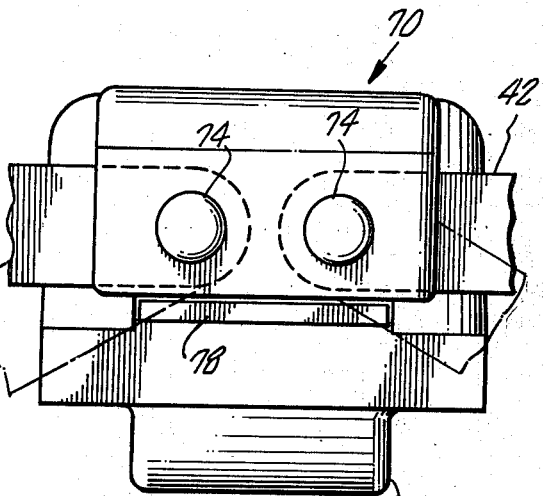
FIG_7_
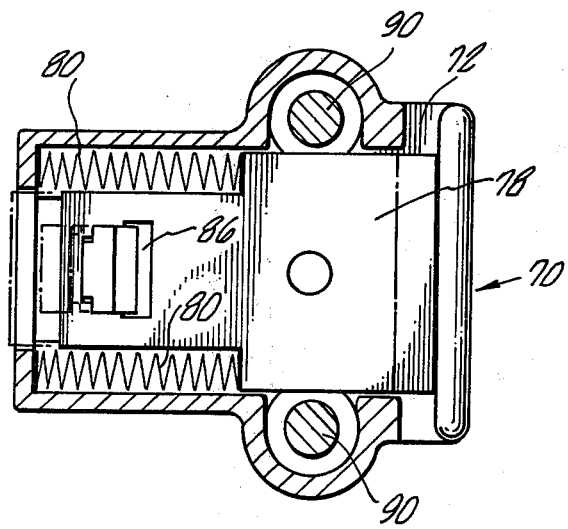
FIG_8_

FOLDABLE INFANT CARRIER

BACKGROUND OF THE INVENTION

The invention herein described relates to foldable infant carriers and to the means by which the carrier is locked into the open position and brought into the folded position.

Foldable infant carriers are known in the art. Many of those presently available, however, are unsatisfactory in several aspects. Quick and convenient means for folding the carrier are particularly difficult to achieve with carriers employing a rigid seat assembly. The adjustment of the infant seat assembly relative to the main frame assembly in many carriers is also generally unduly cumbersome, requiring both hands to operate thereby causing jarring of the infant during adjustment. The present invention solves this deficiency by providing for adjustment by a handle on the back of the infant seat assembly. With one hand, the seat assembly of the present invention may be adjusted while at the same time the weight of the infant may be supported.

Although prior art infant carriers were equipped with sun shades, they were usually rigidly attached to the frame assembly. This did not allow for adequate adjustment to compensate for changes in the location of the sun or in the position of the seat assembly. In one embodiment of the present invention the sun shade is pivotally attached to the seat assembly to obtain proper shading of the infant regardless of seat or sun position.

Prior art carriers also suffered from inadequate means for locking the infant carrier into the open position. This was due to the fact that in so doing, two opposing goals are desired. First, the means selected must provide a reliable, securely locked position such that the infant carrier will not fold unexpectedly. Second, the means selected must provide for quick and easy release so that the infant carrier may be folded without undue time and effort. A means typically employed by prior art devices to accomplish these goals comprised cross members pivotally attached to a central lever and to the main frame. The lever could be pushed past the centerline of the cross members and hence hold the carrier in the locked open position by the tension thereby exerted. This lever device was deficient in that the lever could be easily hit and knocked out of the locked position. Also, the lever could not be used to adjust or lift the carrier in the open position. According to the present invention a novel trigger and latch mechanism is provided which safely and securely maintains the crossbars in a locked position in which the mechanism may be used as a handle to adjust the seat, and which also provides for quick and easy folding of the carrier.

Thus it is the object of the present invention to provide an improved foldable infant carrier which is lockable and foldable by means of a single trigger and latch mechanism.

It is a further object of this invention to provide an infant carrier wherein the seat assembly is substantially rigid rigid in the open position and may be adjusted using one hand while simultaneously supporting the weight of the infant.

It is another object to provide a foldable infant carrier which will securely and reliably lock in the open position but which will also easily and quickly fold to the closed position.

It is yet a further object of the prefered embodiment of the present invention to provide a sun shade assembly in combination with the infant carrier whereby proper shading is provided regardless of the position of the seat assembly or the location of the sun.

Other and further objects of the invention will be apparent to one skilled in the art from a reading of the detailed description of the preferred embodiment and the appended claims.

SUMMARY OF INVENTION

The foldable infant carrier of the invention comprises a main frame assembly which supports a firm infant seat assembly adjustably connected thereto. Both are foldable along a central vertical plane which bisects and extends from the front to the rear of the infant carrier. To aid in folding, the seat bottom of the infant seat assembly is slightly biased toward a folded position. Preferably, the biased seat is connected to a footrest to further aid in folding the carrier.

Preferably, the seat assembly is connected to the frame assembly by a pin and grooved plate arrangement. In this embodiment, a pin attached to the infant seat assembly communicates with a slotted groove in a plate attached to the frame assembly to provide for adjustment of the infant seat assembly to any of at least two positions relative to the frame assembly. Other means for adjustably attaching the seat assembly to the frame assembly will be readily apparent to those skilled in the art.

The means by which the infant carrier is locked into the open position; by which it is released and pulled to a folded position; and by which the seat assembly is adjusted, is incorporated into a single trigger and latch mechanism centrally located on the back of the infant seat assembly such as to allow the seat assembly to be adjusted with one hand while simultaneously supporting the weight of the infant. In the locked open position, the trigger and latch mechanism is a handle for adjusting the seat assembly or moving the carrier. When the trigger is depressed, the mechanism is a handle for folding the carrier.

In the folding operation, the trigger on the trigger and latch mechanism is depressed and the trigger and latch mechanism is pulled sharply in the upward direction. This folds the main frame assembly and the infant seat assembly along the central vertical plane. The legs of the infant carrier are pulled together bringing the front wheels together with the rear wheels to bring the entire infant carrier into a compact assembly suitable for easy storage. Latch means are provided to retain the carrier in this position. To open the carrier, the latch means are disengaged and the trigger and latch mechanism is pushed in a downward direction causing the carrier to unfold and the wheels to separate and extend. The trigger and latch mechanism then locks the carrier into the open position.

In the preferred embodiment, the carrier also comprises a sun shade assembly pivotally attached to the infant seat assembly and not to the main frame. This arrangement allowed the sun shade to be adjusted to an infinite number of positions thereby providing adequate shading regardless of the position of the seat assembly or the location of the sun.

DESCRIPTION OF THE FIGURES

FIG. 6 is a cross-section of a trigger and latch mechanism suitable for use with the invention shown in the latched or locked position. The open position is shown in phantom.

FIG. 7 is a front view of the said trigger and latch mechanism. The pivotal movement of the cross bars is shown in phantom.

FIG. 8 is a cross section of the said trigger and latch assembly taken along line 8—8 in FIG. 6 showing the spring biased latch bar in the latched or locked position. The open position is shown in phantom.

DESCRIPTION OF THE PREFERRED EMBODIMENT

The invention is here shown embodied in a foldable infant stroller. However, it should be understood that the inventive features may be incorporated into other similar devices and the invention is not limited to this presently preferred embodiment, but is limited only by the full scope of the appended claims.

Figure 1:
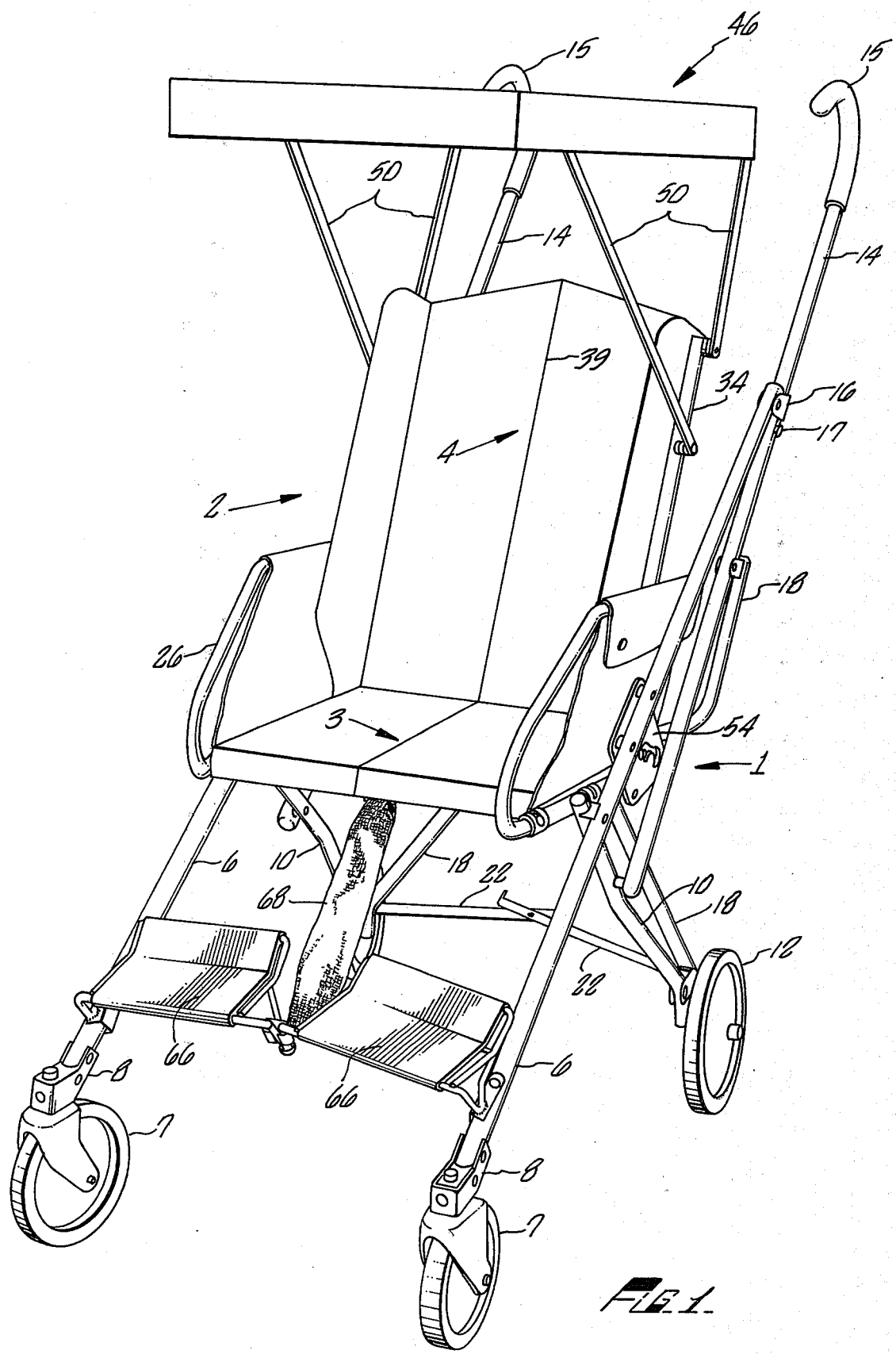
FIG. 1 is a perspective view of a foldable infant carrier according to the invention shown in the locked open position.
Figure 2:
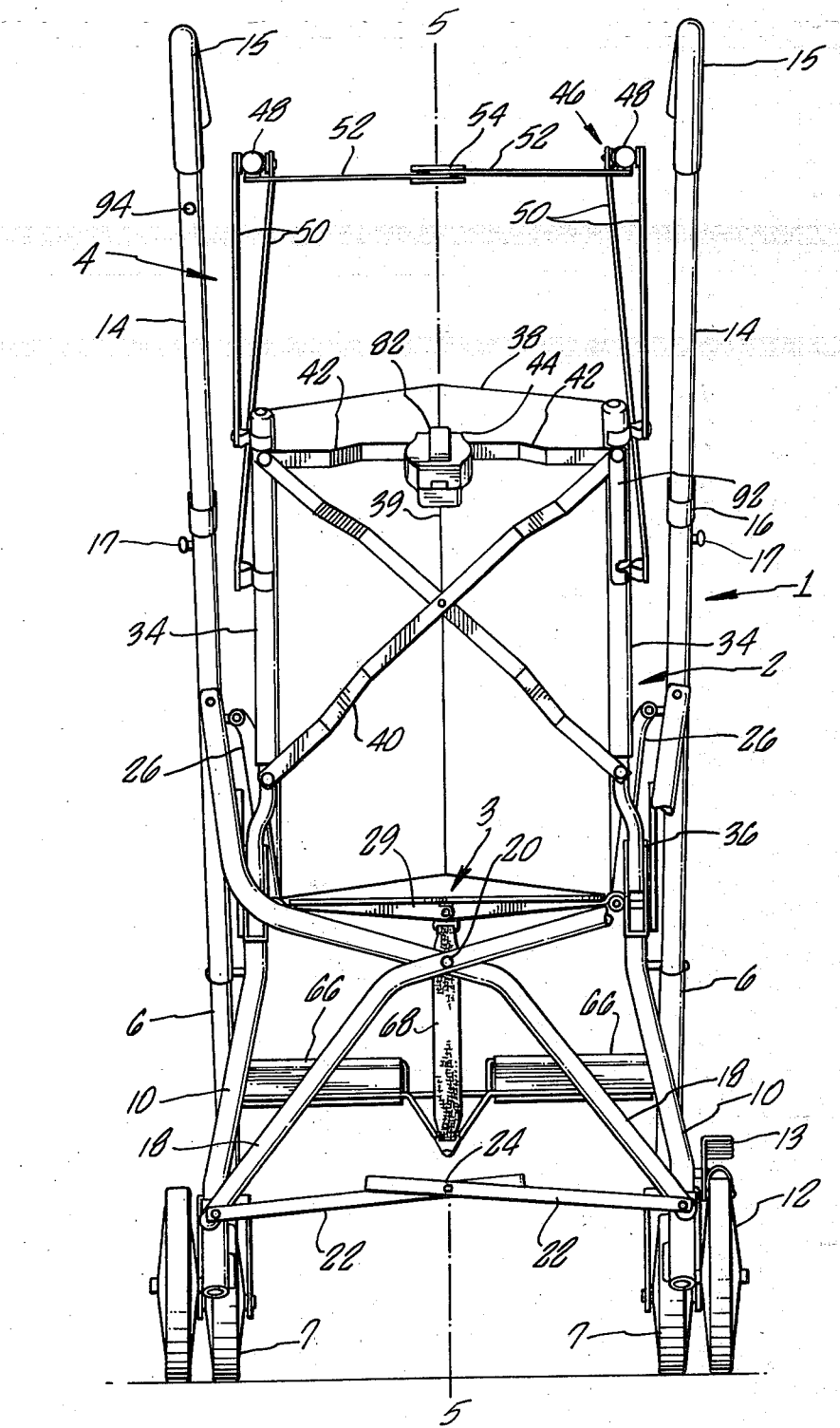
FIG. 2 is a rear view of a foldable infant carrier according to the invention shown in the locked open position.

The foldable infant stroller as shown in FIGS. 1 and 2 comprises generally a main frame assembly 1 and an infant seat assembly 2 comprising seat portion 3 and backrest assembly 4. The infant carrier described herein is, save for minor exceptions, symmetrical about a central vertical plane 5, which bisects and extends from the front of the infant carrier to the back thereof, shown as line 5 in FIGS. 2 and 3. It is along this plane 5 that the infant carrier folds. The main frame assembly has two front legs 6. Front wheels 7 are pivotally attached to front legs 6 by means of load bearing members 8. Two rear legs 10 are each pivotally attached at a first end to a front leg 6. A rear wheel 12 is rotatably attached to each rear leg 10 at a second end by conventional means. Conventional braking member 13 is pivotally attached to rear leg 10 and adapted to snugly engage a rear wheel 12. Two handle support members 14 are each pivotally attached at a lower first end to one rear leg 10 and extend above the infant seat assembly 2 to a second end where handles 15 are connected thereto. The upper end of each front leg 6 is slidably attached to handle support member 14 by conventional brackets 16. Studs 17 restrict the downward movement of front leg 6 along handle support member 14. Two scissoring S-shaped support arms 18 are each pivotally attached at a lower first end to the lower end of a rear leg 10 on opposite sides of main frame assembly 1. The upper second end of each said support arm 18 is pivotally attached to the handle support member 14 on the side of the main frame assembly 1 opposite to the side on which its lower end was attached. The two scissoring support arms 18 are pivotally attached at their intersection point 20. Intersection point 20 is located in the central vertical point 5. L-bars 22 are each pivotally attached at a first end to the lower end of opposing scissoring S-shaped support arms 18. Each L-bar 22 extends inwardly therefrom and intersects the other in central vertical plane 5 at intersection point 24 where they are pivotally connected. The operably connected combination of front legs 6, rear legs 10, handle support members 14, scissoring S-shaped support arms 18 and L-bars 22 form, in the open position, a rigid frame for pushing and pulling the infant carrier and from which the infant seat assembly 2 is depended.

Turning now to the infant seat assembly 2, U-shaped side bars 26 are each pivotally attached on their lower side to front leg 6 and rear leg 10 at the intersection thereof and again to front leg 6 on their upper side. U-shaped side bars 26 provide an attaching and support means for seat portion 3 and containment of and protection to the occupant of the infant carrier. Seat portion 3 is separated into two halves and hinged by conventional means 29 along central vertical plane 5. Seat portion 3 is constructed of any rigid material capable of withstanding the weight of the infant occupant. Each half of seat portion 3 is rotatably connected to the lower side of a U-shaped side bar 26 by brackets 30. The rotational movement of the seat portion 3 about side bar 26 is restricted to a 90° arc from horizontal to vertical by means of a groove in brackets 30 and corresponding stud 32 in side bar 26. Seat portion 3 is biased toward a folded position by conventional spring biasing means. The force of this biasing is such that it will be easily overcome by the weight of the infant occupant.

The backrest assembly 4 of the infant seat assembly 2 has two rigid side support members 34. These are pivotally attached at a lower, first end to the lower end of U-shaped side bars 26 by means of an elongated bracket 36. The side support members 34 extend upward therefrom to an upper, second end at the top of seat back portion 38. Seat back portion 38 is foldable at fold 39 along central vertical plane 5. Seat back portion 38 is fixedly attached to side support means 34 by conventional threaded means. Cross brace members 40 are each pivotally connected at a first end to the lower end of one side support member 34 and pivotally attached at a second end to the upper end of the other side support member 34. In so doing, the cross brace members 40 cross one another and are pivotally attached together at their intersection with central vertical plane 5. Locking cross bars 42 are each pivotally attached at a first end to the upper end of one side support member 34 and one cross brace member 40 at the intersection of the latter two. The cross bars 42 are each pivotally attached at a second end to trigger and latch mechanism 44.

The sun shade assembly incorporated in this preferred embodiment and generally designated 46, is comprised of two sun shade vanes 48 which are each pivotally attached to two separate sun shade poles 50, one at a first end of the sun shade vane 48 and the other at substantially the second end thereof. The sun shade poles 50 are in turn pivotally attached to the upper portion of side support members 34 by conventional means. Two separator bars 52 are each pivotally attached to opposing sun shade vanes 48 at approximately the longitudinal center thereof, extending inward therefrom and are pivotally attached together and within slotted guide 54 at their intersection with central vertical plane 5. The combination of seat back portion 38, side support members 34, cross brace members 40, locking cross bars 40, trigger and latch mechanism 44 and sun shade assembly 46 generally comprises the backrest assembly, generally designated 4 in FIG. 5.

Figure 5:
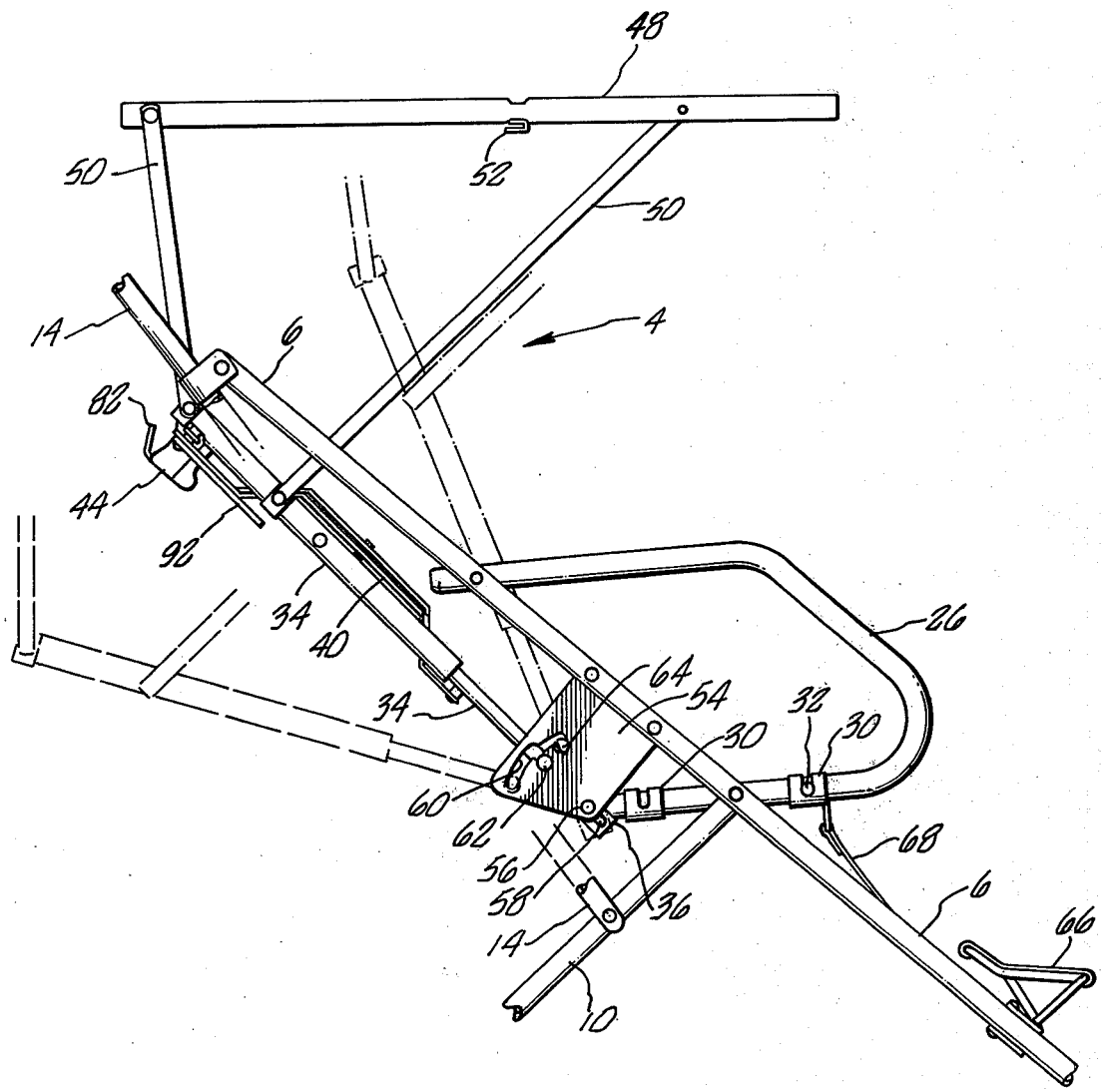
FIG. 5 is a side view of a portion of a foldable infant carrier according to the invention shown with parts broken away to expose and show the pin and slotted groove assembly whereby the infant seat assembly may be adjusted relative to the main frame assembly.

As seen in FIG. 5, the position of the backrest assembly 4 is adjustable relative to the main frame assembly 1. This is accomplished by means of backrest support plates 54 which are each fixedly attached at two corners on a first side to front leg 6 and at one corner on a second side to the lower end of U-shaped side bar 26 at its intersection with elongated bracket 36 which attaches side support member 34 thereto. Elongated bracket 36 pivots about pin 56 which connects support plate 54 and U-shaped side bar 26. The aperture 58 in bracket 36 is elongated to provide for controlled longitudinal movement of bracket 36 and hence the entire backrest assembly 4. Support bracket 54 is equipped with slotted groove 60. Each side support member 34 is equipped with support pin 62 which communicates with slotted groove 60 and engages any one of a plurality of slots 64 therein. The position of the backrest assembly 4 is adjusted by grasping the trigger and latch mechanism 44 without depressing the trigger, which acts as a handle during this operation, and pulling upward to disengage support pin 62 from a slot 64. The backrest assembly may then be raised or lowered, moving support pin 62 in slotted groove 60, to the desired position. More or fewer adjustment positions may be obtained by modification of the bracket means.

Footrest 66 is pivotally attached at each end to front legs 6. Footrest 66 consists of two halves which are hinged by conventional means in the middle of its intersection with central vertical plane 5. A strap 68 connects the footrest 66 at its hinged center to the hinge 29 under seat portion 3. During the folding operation, the biasing of seat portion 28 is communicated to footrest 66 via the strap 68 thereby facilitating folding.

The infant carrier is maintained in the locked open position, or is released to assume the folded position, by means of trigger and latch mechanism 44, shown in FIGS. 6, 7 and 8. Trigger and latch housing, generally designated 70 in FIG. 6, has slot 72 at one end for receipt of locking cross bars 42. Locking cross bars 42 are pivotally attached thereto by conventional rivet means 74. Housing 70 is also shaped to provide a latch bar guide 76 for latch bar 78. Springs 80 bias the latch bar 78 outward to a position under slot 72 and locking bars 42. In this position, the pivotal movement of locking bars 42 is restricted, thereby retaining them in rigid alignment which maintains the seat assembly and, in turn, the frame assembly, locked in the open position. Trigger 82 is positioned through hole 84 in housing 70 and engages latch bar 78, the bottom end of trigger 82 being reduced in width to slide through a rectangular opening 86 in latch bar 78. Base plate 88 attaches to housing 70 by conventional rivets 90. When trigger 82 is depressed, it operates to move latch bar 78 against springs 80 and away from slot 72 and locking cross bars 42. Pivotal movement of cross bars 42 is then allowed and the infant carrier may be pulled into the folded position by pulling sharply up on the trigger and latch mechanism 44.

The seat portion 3, the sun shade assembly 4 and the backrest assembly 4 are fitted with protective upholstery to provide comfort and protection to the infant occupant, as shown in FIG. 1.

Figure 3:
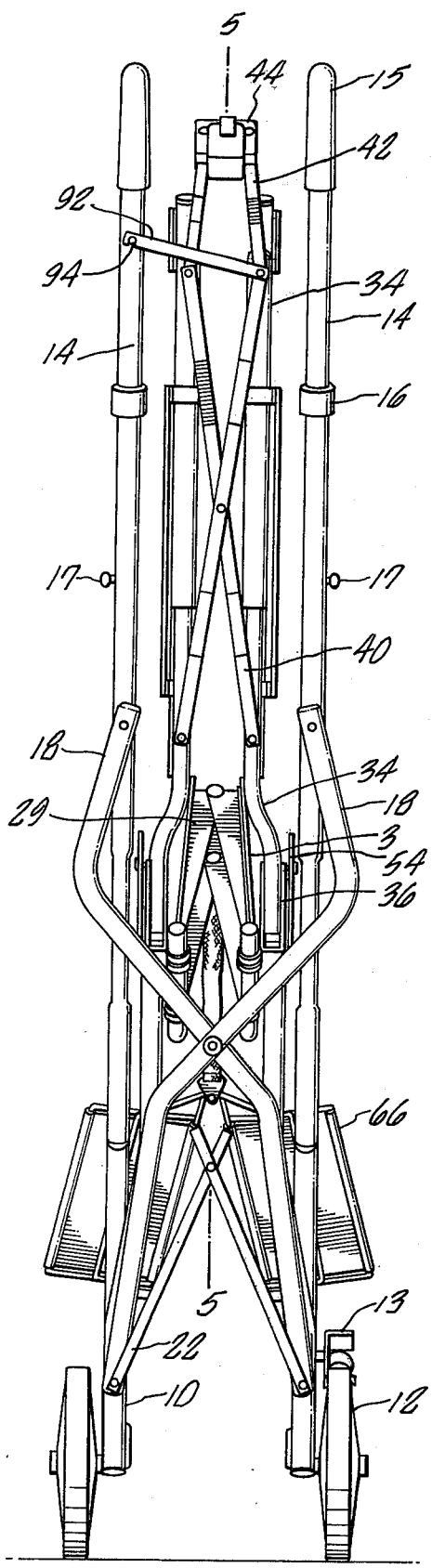
FIG. 3 is a rear view of a foldable infant carrier according to the invention shown in the folded position.
Figure 4:
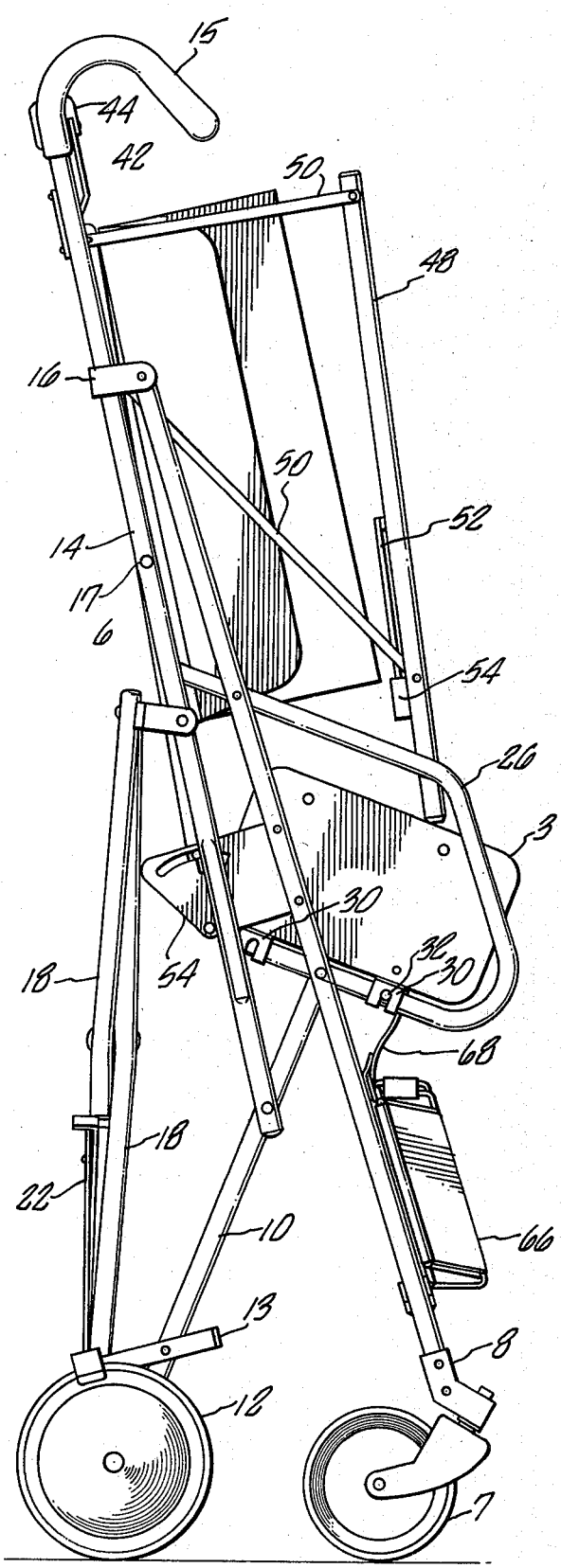
FIG. 4 is a side view of a foldable infant carrier according to the invention shown in the folded position.

The carrier my be stored in the folded position as shown in FIGS. 3 and 4. To obtain this position, trigger 82 is depressed and trigger and latch mechanism 44 pulled sharply in a upward direction. This folds the main frame assembly 1 and infant seat assembly 2 along the central vertical plane 5. Front wheels 7 and rear wheels 12 are pulled together as brackets 16 slide in an upward direction on handle support members 14 thereby moving front legs 6 in a rearward direction. The carrier is retained in the folded position by means of hook 92, pivotally attached to the side support member 34, which engages peg 94, fixedly attached to hand support member 14.

To open the infant carrier, hook 92 is disengaged from peg 94 and trigger and latch mechanism 44 is pushed in a downward direction, unfolding main frame assembly 1 and seat assembly 2 and extending and separating front wheels 7 and rear wheels 12. When fully extended, trigger and latch mechanism 44 locks the infant carrier into the open position.

While embodiments and applications of this invention have been shown and described, it would be apparent to those skilled in the art that many more modifications and embodiments are possible without departing from the inventive concepts herein described. The invention, therefore, is not to be restricted except by the spirit of the appended claims.

What is claimed is:

1. A foldable infant carrier, comprising in combination:
   a. a main frame assembly foldable along a central vertical plane which bisects and extends from front to rear of said carrier;
   b. an infant seat assembly operably connected to said main frame assembly, said seat assembly also foldable along said central vertical plane;
   c. means operably connected to said main frame assembly and said infant seat assembly supporting said infant seat assembly in one of at least two positions relative to said main frame assembly; and
   d. a trigger and latch mechanism operably connected to said seat assembly for (1) securing the foldable infant carrier in an open position, (2) releasing the infant carrier to be pulled to a closed position and (3) providing handle means for changing the position of said infant seat assembly relative to said main frame assembly, and for pulling the carrier to a closed position or pushing it to an open position, said mechanism comprising cross members pivotably attached to said infant seat assembly and trigger and latch means located in said central vertical plane, to which said cross members are pivotally attached, for holding said cross members in rigid alignment, said trigger and latch means having a spring loaded, trigger activated, retractable latch member which engages said cross members to restrain their pivotal movement.

2. The foldable infant carrier of claim 1 wherein said retractable latch member is biased to a position which holds said cross members in rigid alignment.

3. The foldable infant carrier of claim 2 wherein said trigger and latch means further comprises a housing having a slot formed therein in which one end of each of said cross members is pivotally attached and in which said cross members are retained by said latch member.

4. A foldable infant carrier comprising:
   a. a main frame assembly foldable along a central vertical plane which bisects and extends from front to rear of said carrier;
   b. an infant seat assembly operably connected to said main frame assembly, said seat assembly also foldable along said central vertical plane;
   c. means operably connected to said main frame assembly and said infant seat assembly supporting said infant seat assembly in one of at least two positions relative to said main frame assembly; and
d. a trigger and latch mechanism comprising crossmembers pivotally attached to said infant seat assembly and a trigger and latch means for holding the cross members rigid, said trigger and latch means located in said central vertical plane and comprising:
 (i) a housing;
 (ii) a slot in said housing for receipt of said cross members, one end of each said cross members pivotally attached therein near the center of said slot, said slot being of sufficient depth and length such that a substantial portion of each such cross member may reside therein;
 (iii) retractable latch means in said housing;
 (iv) spring means for biasing said latch means to an extended position over said slot to lock said cross members in said slot; and
 (v) trigger means connected to said housing and engaging said latch means for retracting said latch thereby allowing the infant carrier to be urged to a folded position.

5. A foldable infant carrier capable of assuming a locked open position and a folded closed position which is foldable along a central vertical plane bisecting said carrier and extending from the front to the rear thereof, said carrier comprising in combination:
 a. a main frame assembly, foldable along said central plane, having two front legs each having a wheel pivotally connected thereto, two rear legs each having a wheel rotatably connected thereto, support means for rigidly supporting the main frame assembly in the open position and handle means for carrying and pushing said infant carrier, said four leg members, support means and handle means being operably connected to each other to provide, in the open position, a rigid frame assembly for supporting and pushing an infant seat assembly connected thereto;
 b. two backrest support brackets operably connected to said support means, said brackets having a plurality of notch means to engage and support a backrest in any one of at least two positions;
 c. an infant seat assembly, foldable along said vertical plane, operably and adjustably connected to said main frame assembly and adapted to rigidly support an infant in an open position, said infant seat assembly comprising, in combination:
  (1) a substantially rigid backrest portion adapated to be folded along said vertical plane;
  (2) a backrest frame assembly connected to said backrest portion adapted to lock said backrest in a rigid open position, comprising in combination:
   (a) two side support members each having an upper and lower end and each having support pins at the lower ends thereof for engaging any one of said notch means in said backrest support bracket;
   (b) two cross brace members each pivotally connected to the lower end of one of said side support members and the upper end of the other of said side support members;
   (c) locking cross members pivotally connected at one end thereof to the upper end of opposing said side support members and at the other end thereof within a slot in a trigger and latch mechanism, said trigger and latch mechanism operable to restrain the pivotal movement of said cross members by means of a latch, retractably housed within said mechanism, which latch engages and restrains said cross members within said slot;
  (3) a rigid seat portion adapted to be folded along said vertical plane;
  (4) a seat frame assembly connected to said seat portion and rigidly connected to said main frame assembly;
  (5) biasing means for biasing said seat portion towards the folded position and;
  (6) connector means for connecting said seat portion to a footrest means;
 d. footrest means foldable along said vertical plane and pivotally connected to said main frame assembly and to said seat portion by said connector means, and
 e. said trigger mechanism being adaptable to lock said main frame assembly and said backrest support means and said seat portion in said open position and to provide a handle for adjusting said backrest portion in the locked open position and adaptable to be released and providing a handle for folding said infant carrier along said vertical plane.

6. An infant carrier comprising a main frame assembly, foldable along its central plane, having a plurality of leg members to which wheels are attached; an adjustable seat assembly foldable along its central plane, operably attached to said main frame assembly, having a seat portion and a backrest assembly having side support members; and means for securing the carrier into the open position, releasing the carrier for pulling it into a folded position, and providing a handle for adjusting the position of said backrest assembly relative to said main frame assembly and for pulling the carrier into a folded position, or pushing it to an open position, said means comprising trigger and latch means and opposing cross members, a first end of each cross member being pivotally attached to said trigger and latch means and a second end of each cross member being pivotally attached to a side support member of said seat assembly, said trigger and latch means having a retractable, spring loaded, trigger activated latch means for engaging said opposing cross members to restrict their pivotal movement, thereby locking the carrier into the open position.

7. The infant carrier of claim 6 wherein said trigger and latch means has a slot formed therein, said first end of each said opposing cross member attached to said trigger and latch means within said slot such that the pivotal motion of said cross members moves them into and out of lineal alignment with said slot.

8. The infant carrier of claim 7 wherein said retractable latch means, in the extended position, abuts said slot to retain said cross members therein.

* * * * *